United States Patent
Kuno et al.

(10) Patent No.: US 6,719,528 B2
(45) Date of Patent: Apr. 13, 2004

(54) STATOR VANE ARRANGEMENT FOR ROTATING MACHINERY

(75) Inventors: Naoki Kuno, Wako (JP); Gensuke Hoshino, Wako (JP); Shuichi Honda, Wako (JP); Toyotaka Sonoda, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 3 days.

(21) Appl. No.: 10/260,422

(22) Filed: Oct. 1, 2002

(65) Prior Publication Data

US 2003/0129056 A1 Jul. 10, 2003

(51) Int. Cl.⁷ .................................................. F01D 9/04
(52) U.S. Cl. ........................................................ 415/191
(58) Field of Search ............................... 415/191, 208.2, 415/199.5, 210.1

(56) References Cited

U.S. PATENT DOCUMENTS 5,765,993 A * 6/1998 Weiss ........................ 415/191
6,283,713 B1 * 9/2001 Harvey et al. ............. 415/191
6,538,887 B2 * 3/2003 Belady et al. ........... 415/208.2

FOREIGN PATENT DOCUMENTS

JP          03189304 A   *  8/1991   ........... F01D/09/02

* cited by examiner

Primary Examiner—Thomas Denion
Assistant Examiner—Thai-Ba Trieu
(74) Attorney, Agent, or Firm—Squire, Sanders & Dempsey L.L.P.

(57) ABSTRACT

In a stator vane arrangement including a plurality of stator vanes axially opposing a plurality of rotor vanes in rotating machinery, each stator vane is tilted with respect to a radial line so that the load acting on the hub end of each stator vane is reduced and a secondary flow is minimized. This allows the aspect ratio of each stator vane to be reduced, and the number of stator vanes to be reduced without impairing the efficiency of the rotating machinery. This in turn allows the frequency of the oscillator force produced by the stator vane in relation with the motion of the rotor vanes to be lowered so that a resonant condition of the stator vanes can be avoided relatively easily.

4 Claims, 4 Drawing Sheets

STATOR VANE ARRANGEMENT FOR ROTATING MACHINERY

TECHNICAL FIELD

The present invention relates to a stator vane arrangement for rotating machinery in which stator vanes are arranged axially adjacent to rotor vanes.

BACKGROUND OF THE INVENTION

In rotating machinery such as a gas turbine engine, stator vanes defining a plurality of nozzles are often arranged axially adjacent to rotor vanes. In such an arrangement, it is customary to select the solidity of each stator vane (axial dimension of the stator vane/circumferential gap between adjacent stator vanes) to be greater than a certain value so as to control the pressure loss by the stator vanes. It is typically accomplished by increasing the number of stator vanes so as to reduce the circumferential gap between adjacent vanes and reduce the axial dimension of each vane or increase the aspect ratio thereof (height of the trailing edge (h)/axial length at the hub (C)). A high aspect ratio means a slender stator vane.

However, increasing the number of stator vanes means an increase in the frequency of the oscillatory force that is produced by the stator vanes as the rotor vanes pass by the stator vanes in close proximity. To avoid a resonant vibration of the rotor vanes, it is necessary that the resonant frequency ($\omega$) of each rotor vane is adequately higher than the frequency (nN/60) of the external force produced by the stator vanes in relation with the rotor vanes.

Therefore, it is typically necessary to limit the number of stator vanes to avoid a resonant condition for being produced in the rotor vanes in a normal range of the rotational speed of the engine. Reducing the number of stator vanes necessarily requires the aspect ratio of each stator vane to be reduced. It is illustrated in FIG. 7. If the aspect ratio is 1 as indicated by the dotted line, the resonant condition is produced below the operating speed range (first mode) and within the operating speed range (second mode). On the other hand, if the aspect ratio is reduced to 0.32, the resonant condition is not produced as long as the engine rotation speed is within the operating range or lower. However, conventionally, reducing the aspect ratio causes a significant increase in the pressure loss by the stator vanes, and this necessitated a certain compromise in gas turbine engines.

BRIEF SUMMARY OF THE INVENTION

In view of such problems of the prior art, a primary object of the present invention is to provide a stator vane arrangement for rotating machinery which allows the aspect ratio of each stator vane to be reduced so as to reduce the number of stator vanes without incurring an undesired pressure loss.

A second object of the present invention is to provide a stator vane arrangement for rotating machinery which allows the pressure loss by the stator vanes to be controlled.

A third object of the present invention is to provide a stator vane arrangement for rotating machinery which allows the resonant condition of the rotor vanes to be controlled by appropriately selecting the configuration of the stator vanes located immediately upstream of the rotor vanes.

A fourth object of the present invention is to provide a stator vane arrangement for rotating machinery which can provide a high performance while simplifying the fabrication process for the stator vanes.

A fifth object of the present invention is to provide a stator vane arrangement for rotating machinery which can provide a high performance while controlling the stress in the stator vanes.

According to the present invention, such objects can be accomplished by providing a stator vane arrangement including a plurality of stator vanes axially opposing a plurality of rotor vanes in rotating machinery, wherein: an aspect ratio of each stator vane as given as a ratio of a height of a trailing edge thereof to an axial length of a hub end thereof is 0.5 or less, and a tilt angle of a back surface of the stator vane at a trailing edge thereof with respect to a radial line is between 7 degrees and 42 degrees. The aspect ratio is more preferably approximately 3.0 for an optimum result.

Thus, by leaning or tilting each stator vane with respect to a radial line, the load acting on the hub end of each stator vane is reduced and a secondary flow is minimized. This contributes to the reduction in the pressure loss.

Preferably, a ratio of a distance between a trailing edge of each stator vane and a leading edge of the corresponding rotor vane to an axial length of the stator vane measured along a hub end of the vanes is 0.25 or smaller. By thus reducing the distance between a trailing edge of each stator vane and a leading edge of the corresponding rotor vane, the vortices that are produced immediately downstream of each stator vane are forwarded to the rotor vanes before they grow to any significant extent. This additionally contributes to the reduction in the pressure loss.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
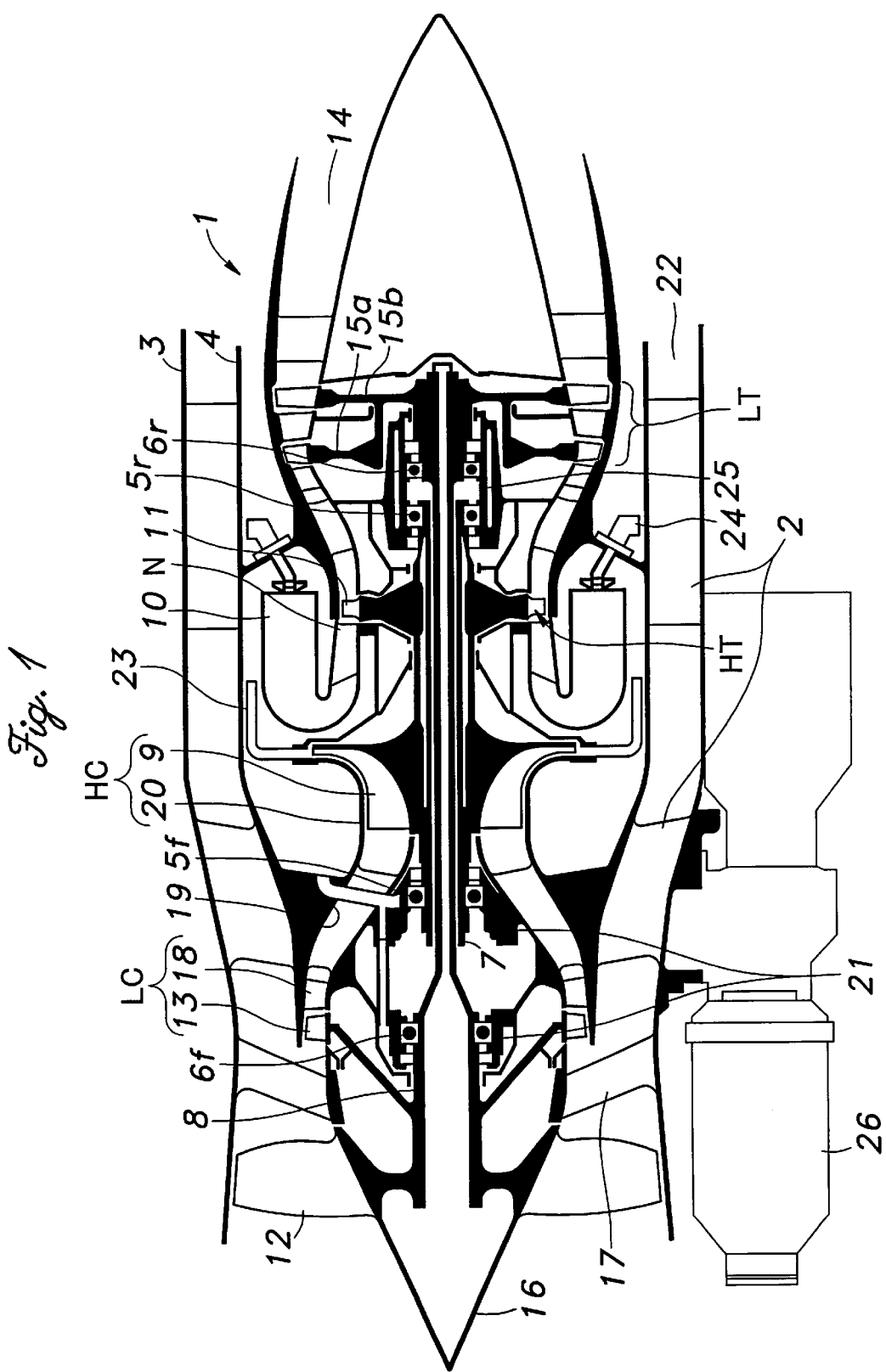
FIG. 1 is schematic sectional view of a bypass jet engine embodying the present invention.

FIG. 1 is a schematic view of a multiple shaft bypass jet engine embodying the present invention. This engine 1 comprises an outer casing 3 and an inner casing 4 consisting of coaxially arranged cylindrical members joined by straightening vanes 2, and an outer shaft 7 and an inner shaft 8 consisting of coaxially arranged hollow shafts centrally supported in the casings by independent bearings 5f, 5r, 6f and 6r.

The outer shaft 7 has a front end integrally carrying an impeller wheel 9 of a high pressure centrifugal compressor HC, and a rear end integrally carrying a high pressure turbine wheel 11 of a high pressure turbine HT.

The inner shaft 8 has a front end integrally carrying a front fan 12 and a compressor wheel 13 supporting rotor vanes for a low pressure axial flow compressor LC immediately behind the front fan 12, and a rear end integrally carrying a pair of turbine wheels 15a and 15b supporting rotor vanes placed in a combustion gas flow in a jet duct 14 so as to form a low pressure turbine LT.

A nose cone 16 is centrally provided on the front fan 12, and stator vanes 17 are provided behind the nose cone 12 with their outer ends attached to the inner circumferential surface of the outer casing 3.

Stator vanes 18 of the low pressure axial flow compressor LC are disposed on the inner circumferential surface of a front end portion of the inner casing 4. Behind the stator vanes 18 are provided an intake duct 19 for conducting the air drawn by the front fan 12 and pre-compressed by the low pressure axial flow compressor LC to the high pressure centrifugal compressor HC, and an impeller casing 20 of the high pressure centrifugal compressor HC. The inner peripheral part of the intake duct 19 is integrally provided with a bearing box 21 for the bearings 5f and 6f which support the front ends of the outer shaft 7 and inner shaft 8, respectively.

The air drawn by the front fan 12 is in part forwarded to the high pressure centrifugal compressor HC via the low pressure axial flow compressor LC as mentioned earlier, and the remaining larger amount of air having a relatively low velocity is expelled rearward through a bypass duct 22 defined between the outer casing 3 and inner casing 4 to provide a primary thrust in the low speed range.

To the outer periphery of the high pressure centrifugal compressor HC is connected a diffuser 23 so as to provide a high pressure air to reverse flow combustion chambers 10 provided downstream to the diffuser 23.

In each of the reverse flow combustion chambers 10, the fuel ejected from a fuel injection nozzle 24 provided on the rear end of the combustion chamber 10 is mixed with the high pressure air supplied from the diffuser 23, and is combusted. The combustion gas which is expelled from the nozzle N of each combustion chamber 10 which is directed rearward is ejected to the atmosphere via the jet duct 14, and provides a primary thrust in the high speed range.

The inner peripheral part of the jet duct 14 is integrally provided with a bearing box 25 for the bearings 5r and 6r which support the rear ends of the outer shaft 7 and inner shaft 8, respectively.

The outer shaft 7 of the engine 1 is connected to an output shaft of a starter motor 26 via a gear mechanism now shown in the drawings. As the starter motor 26 is activated, the impeller wheel 9 of the high pressure centrifugal compressor HC is driven, along with the outer shaft 7, and this causes high pressure air to be supplied to the reverse flow combustion chambers 10. When fuel mixed with this high pressure air combusts, the resulting pressure of the combustion gas drives the turbine wheel 11 of the high pressure turbine HT and the turbine wheels 15a and 15b of the low pressure turbine LT. The rotational power of the high pressure turbine wheel 11 drives the impeller wheel 9 of the high pressure centrifugal compressor HC, and the rotational power of the turbine wheels 15a and 15b of the low pressure turbine LT drives the compressor wheel 13 of the low pressure axial flow compressor LC. As the high pressure turbine wheel 9 and low pressure turbines 15a and 15b are driven by the jet pressure of the combustion gas, the engine 1 maintains its rotation according to a negative feedback balance between the amount of fuel supply and the amount of intake air.

Figure 2:
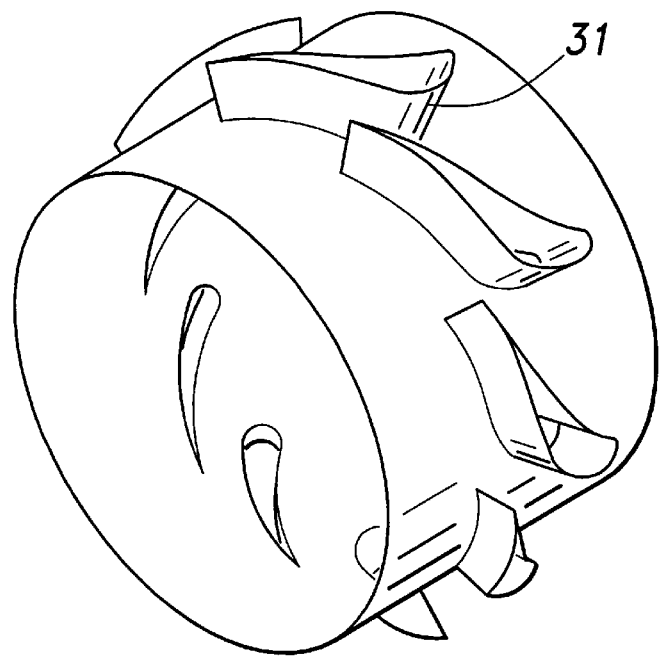
FIG. 2 is an enlarged fragmentary perspective view of the stator vane assembly.
Figure 3:
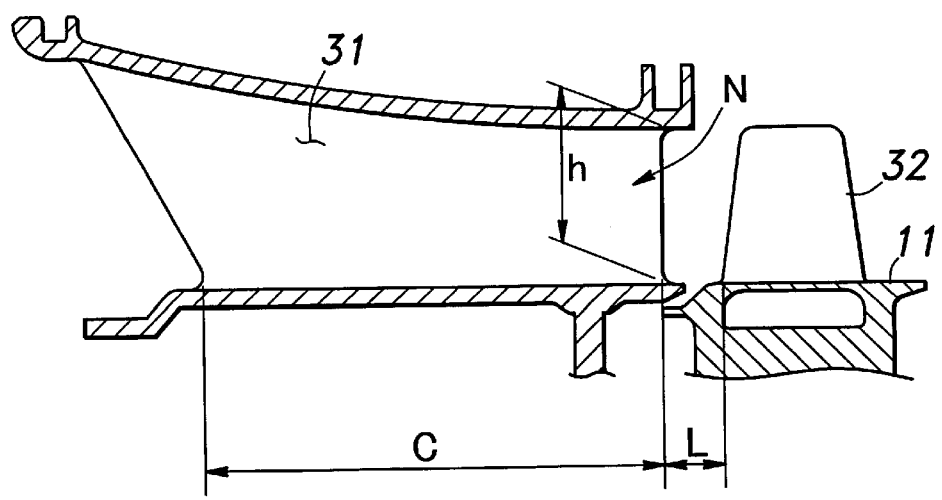
FIG. 3 is an enlarged fragmentary sectional view showing the relationship between a stator vane and a rotor vane.

FIG. 2 is a perspective view of the stator vanes 31 forming nozzles N for the reverse flow combustion chambers 10, and FIG. 3 is a fragmentary sectional view taken along the longitudinal line showing the relationship between the stator vanes 31 and the rotor vanes 32 of the high pressure turbine wheel 11. The aspect ratio of each of these stator vanes 31 is approximately 0.32 (height of the trailing edge (h)/axial length at the hub (C)), and the number of the stator vanes 31 is eight. However, a favorable result can be achieved if the aspect ratio is 0.5 or less. Conventionally, the aspect ratio was typically 1.0 or greater.

Figure 4:
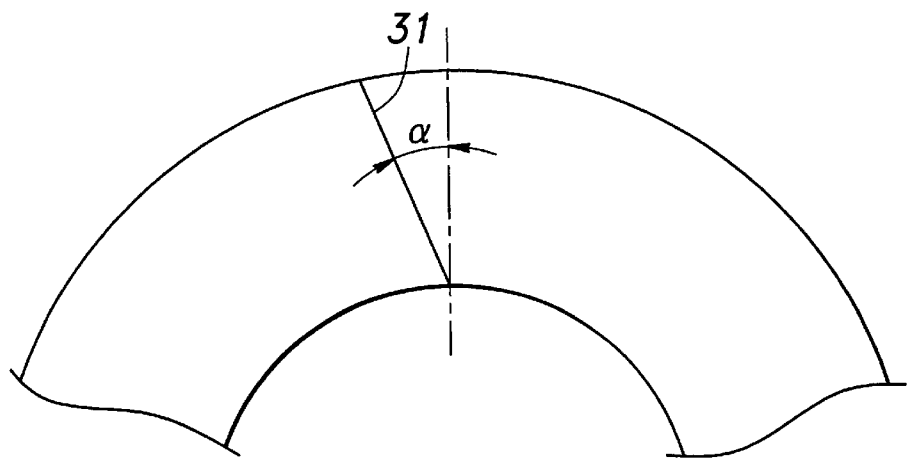
FIG. 4 is a schematic rear end view of the stator vane assembly.
Figure 5:
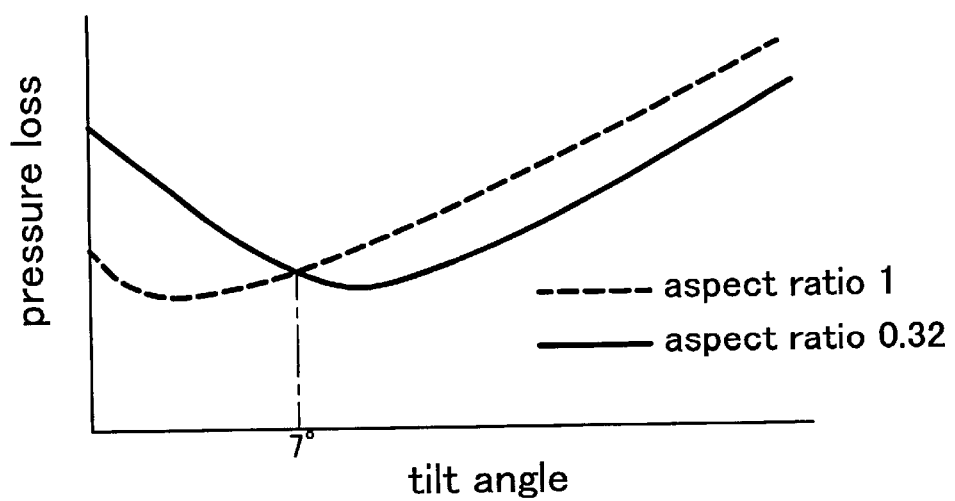
FIG. 5 is a graph showing the relationship between the tilt angle and pressure loss.

As mentioned earlier, if the aspect ratio of each stator vane is reduced so to avoid the resonant vibration of the rotor vanes, the pressure loss of the stator vanes 31 increases. According to the illustrated embodiment, to minimize such a pressure loss, each stator vane 31 is tilted as shown in FIG. 4. By confining the tilt angle of the backside or back surface of each stator vane 31 with respect to a radial line to between 7 degrees and 42 degrees, the pressure loss can be reduced to a level lower than that produced when the stator vane aspect ratio is one or greater as shown in FIG. 5. This is because the load in a region adjacent to the hub is reduced, and the secondary flow which is responsible for the pressure loss can be thereby reduced. The tilt angle should be less than 42 degrees because a tilt angle beyond this value is difficult to accomplish for various manufacturing problems (be it a machining process or casting process), and gives rise to an increase in mechanical stress. A turbine engine using stator vanes having a tilt angle of 42 degrees was actually manufactured and tested, but the stress concentration at the hub end of each stator vanes was unacceptably high, and the low cycle fatigue property of the stator vane was very poor.

Figure 6:
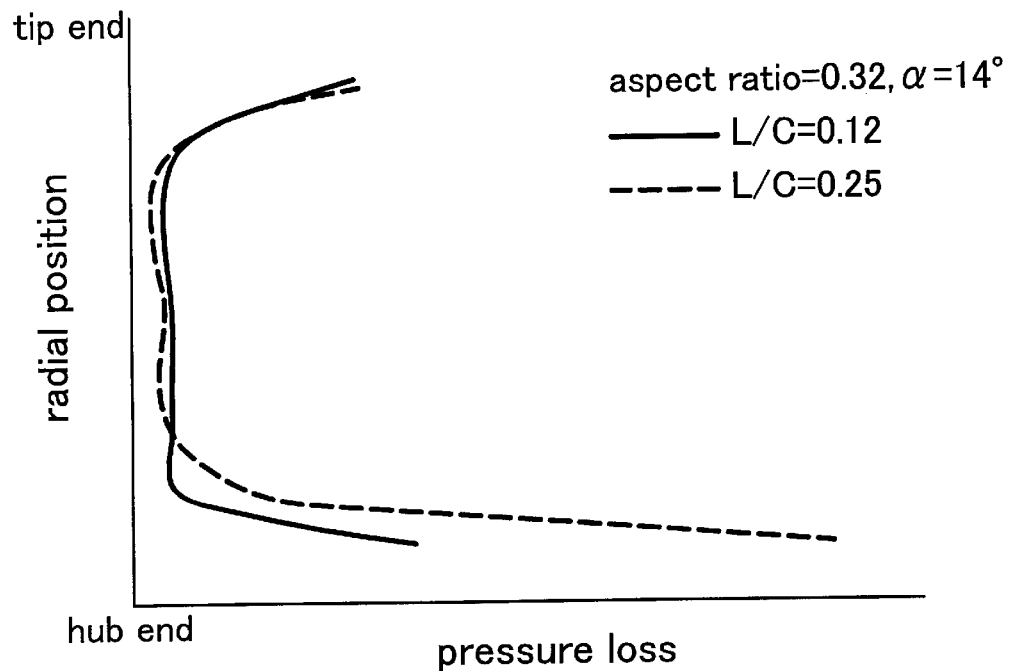
FIG. 6 is a graph showing the effect of a ratio of a distance between a trailing edge of each stator vane and a leading edge of the corresponding rotor vane to an axial length of the stator vane measured along a hub end of the vanes on the pressure loss.
Figure 7:
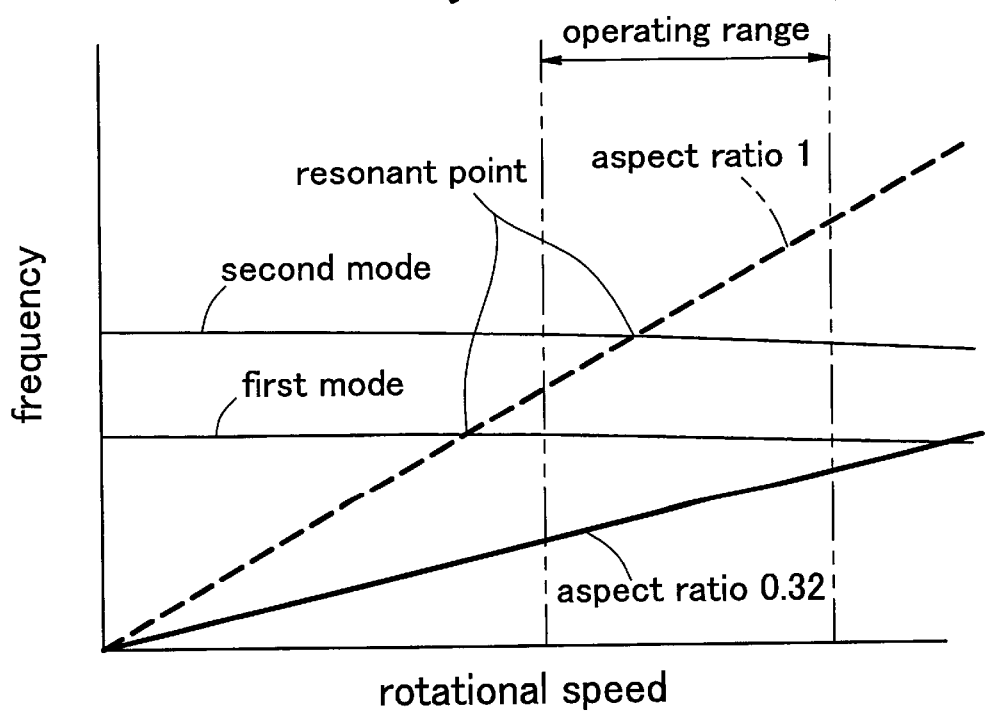
FIG. 7 is a diagram showing how the aspect ratio is related to the resonant condition of the rotor vanes.

By controlling the distance L between the trailing edge of each stator vane 31 and the leading edge of the adjacent rotor vane 32 in relation to the axial length C of the stator vane 31 to be such that 0<L/C<0.25, vortices produced downstream of each stator vane 31 are allowed to flow into the rotor vanes 32 before they develop to a significant extent. This contributes to the reduction in the pressure loss that is produced adjacent to the hub of the stator vanes 31 (see FIG. 6).

Thus, according to the present invention, the aspect ratio of each stator vane can be reduced without increasing the pressure loss, and the resonant vibrations of the rotor vanes in a normal operating range can be avoided.

Although the present invention has been described in terms of a preferred embodiment thereof, it is obvious to a person skilled in the art that various alterations and modifications are possible without departing from the scope of the present invention which is set forth in the appended claims. For instance, the foregoing embodiment was related to a gas turbine engine of a particular type, but the present invention can be applied to any turbine engine, compressor or other rotating machinery in which a plurality of stator vanes are placed adjacent to rotor vanes.

What is claimed is:

1. A stator vane arrangement including a plurality of stator vanes axially opposing a plurality of rotor vanes in rotating machinery, wherein:

an aspect ratio of each stator vane as given as a ratio of a height of a trailing edge thereof to an axial length of a hub end thereof is 0.5 or less, and a tilt angle of a back surface of said stator vane at the trailing edge thereof with respect to a radial line is between 7 degrees and 42 degrees.

2. A stator vane arrangement according to claim 1, wherein a ratio of a distance between a trailing edge of each stator vane and a leading edge of the corresponding rotor vane to an axial length of said stator vane measured along a hub end of said vanes is 0.25 or smaller.

3. A stator vane arrangement according to claim 1, wherein said stator vane arrangement is adapted for use in a compressor section of a gas turbine engine.

4. A stator vane arrangement according to claim 1, wherein said aspect ratio is approximately 0.3.

* * * * *